Nov. 8, 1960 J. F. MARSHALL 2,959,509
NEEDLED FELT
Filed Aug. 15, 1955
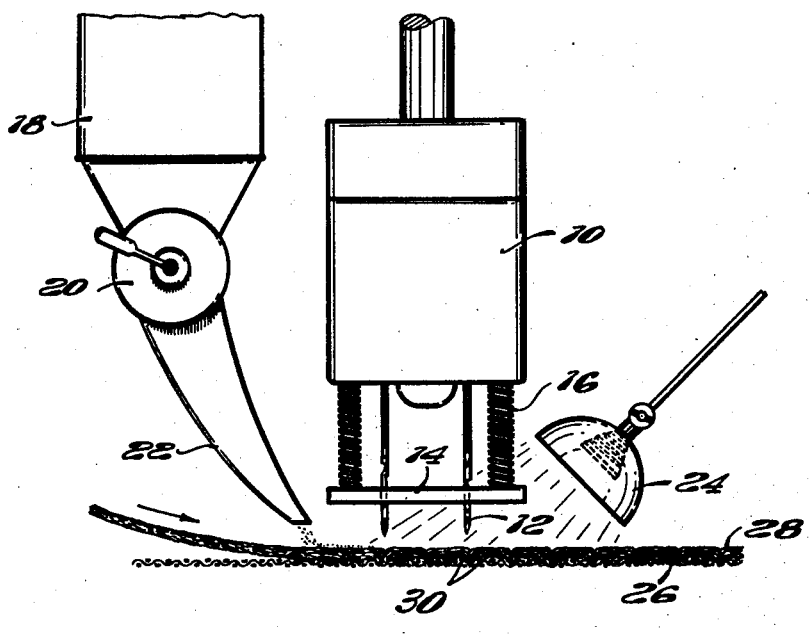
INVENTOR.
Jule F. Marshall.
BY
Kenway, Jenney, Witter & Hildreth
Attys.

2,959,509

NEEDLED FELT

Jule F. Marshall, Greenwich, Conn., assignor to American Felt Company, Glenville, Conn., a corporation of Connecticut Filed Aug. 15, 1955, Ser. No. 528,420

7 Claims. (Cl. 154—101)

This invention relates to needled felts and comprises felting of that type improved in respect to strength, abrasion resistance and other characteristics as compared to needled felts heretofore known. The invention includes within its scope the novel process of manufacturing my improved felt.

Needled felts are commonly formed from unsupported felts, from unsupported bats or multiple bats or from any combination of nap-forming or pile forming bats needled in one or more layers to a base fabric. Various expedients have been tried for securely anchoring the nap or pile fibers such as repeated needling from both sides or the application of an adhesive layer to the uncovered side of the base fabric. Both of these expedients are objectionable. Excessive needling is likely to cut to pieces a base fabric and an adhesive layer impairs the porosity of the product desired for many uses.

The process of my invention is characterized by the steps of needle punching a layer of nap-forming material separately or upon an underlying layer of base fabric, sifting into the fibers of the layer or layers a fusible or thermoplastic synthetic resin in powdered form and heating the resin among the fibers of the felt to render the resin adhesive. Preferably and in accordance with a further feature of the invention the heating of the resin is effected or at least partially supplied by frictional heat developed in passing the needles into and out of the felt.

Several suitable synthetic resins are available in powdered form, for example, polymers or copolymers of vinyl chloride, acetate, or methylmethacrylate, or of polystyrene. Phenol formaldehyde resin may also be employed in the B stage wherein it is softenable by heat before taking its final set. Other suitable synthetic resins are the vinyl copolymer of vinyl chloride and vinyl acetate commercially designated as VYHH, and zinc resinates. These resinates, in addition to good bonding properties, enhance the filter characteristics of the needled felt since the frictional action of the needles induces an electrostatic charge on the resinate particles.

The process of my invention may be carried out under commercial conditions with the assistance of needle punching machinery already available but equipped with means for delivering the powdered synthetic resin to the preformed bat immediately before its advance to the needle punching area. The powdered resin may thus be supplied at the proper rate to distribute itself upon and within the layers or plies which are to be immediately punched by needles which develop sufficient frictional heat to render adhesive the resin particles which they encounter. The heat thus supplied may be supplemented by an infra red heater directed in general to the punching area of the work. The powdered resin may be added to the fibers to be punched at any time prior to the needling operation, either immediately before or during the earlier blending, picking, garnetting or carding steps.

These and other features of the invention will be best understood and appreciated from the following description of one manner of carrying out my novel process as shown in the accompanying drawings in which:

The figure is a diagrammatic view showing the elements of a needle punching machine as seen from one end thereof together with a portion of the work shown in longitudinal section.

Needle punching machines as herein shown include in their organization a vertical reciprocating cross head 10 equipped with a gang of barbed or etched needles 12. The cross head may extend transversely across the full width of the goods or it may be subdivided into a plurality of movable needle-carrying heads adapted to move in timed relation with respect to the feed of the work during the needling operation. The needles may be arranged in any desired pattern, as for example in two banks with quarter inch spacing. As herein shown the cross head 10 is provided with a stripper or hold down plate 14, suspended beneath the cross head by compression springs 16. The stripper plate is perforated for the free passage of the needles and serves to hold down the work and free it from the needles as the latter are withdrawn.

As herein shown a hopper 18 is mounted upon any convenient support adjacent to the cross head and is of sufficient size to hold an ample supply of the powdered synthetic resin or to be supplied from a reservoir of still greater capacity. The hopper 18 converges downwardly to a valve 20 by which the rate of discharge is governed and this in turn communicates with a delivery nozzle 22 directed downwardly in position to discharge upon the work across its full width adjacent to the punching area and on the approaching side thereof.

Upon the other side of the punching area is supported in any convenient manner an infra red heater 24. This is directed as closely as possible upon the punching area and so supplements the frictional heat developed by the needles 12.

In the figure the base fabric 26 is represented as being of a woven structure of any desired character, for example, the warp threads may be formed of ply yarn and the filling strands may be twisted if it is desired to fabricate a felt having less lengthwise than widthwise stretch. The fabric may be woven with large or small interstices and the fiber may be natural or synthetic, fullable or non-fullable, woven or felted as desired.

The base fabric may advantageously be made with a percentage of thermoplastic fiber in the yarn since this enhances the bonding of the needled fibers into the base fabric. The nap or pile-forming layer 28 may comprise one or more layers of fleece of wool, cotton or a synthetic fiber such as nylon. If desired the pile-forming layer may include thermoplastic vinyon or thermoplastic acetate as well as prestretched fibers that will shrink in the presence of heat, or any of the synthetic fibers such as rayon, nylon, Dacron, Orlon, dynel and saran. The two layers are advanced to the punching area as suggested in the figure and become more or less permeated with the flour-like particles 30 of the powdered synthetic resin in a dry state.

When the work in this condition has been advanced to the punching area the needles 12 pass through and through the two layers becoming frictionally heated and carrying the fleece fibers down into and through the base fabric 26. The needles come in contact with the resin particles 30 which are thus rendered adhesive and serve to unite, bind or cause coalescence of the fibers of each layer to each other and to the overlying and underlying layers in the area of the product traversed by the needles where the resin particles are encountered. It will be seen therefore that in addition to the usual frictional and interlocking engagement of the fibers there is created an all pervasive adhesive union of fiber to fiber increasing the strength of the felt, its resistance to abrasion and chemical action. It also expedites the compacting action of the needling operation so that a more compact felt product is produced with less needling than heretofore and this applies to the treatment of an unsupported bat of pile-forming fiber as well as to those supported by a base fabric.

While the drawing shows a radiant heater located adjacent to the punching area it will be apparent that the precise form of the heater is of secondary importance and that any satisfactory type of heater may be substituted.

Having thus disclosed my invention and described in detail an illustrative example thereof, I claim as new and desire to secure by Letters Patent:

1. The process of making needled felt which is characterized by the steps of needle-punching a layer of pile material upon an underlying layer of base fabric, and sifting into the two layers a fusible synthetic resin in powdered form immediately before the needle-punching operation occurs and rendering the powdered resin tacky during the needle-punching operation.

2. The process of making needled felt which is characterized by the steps of passing a base fabric and an overlying layer of pile material through a needle-punching area, applying a fusible synthetic resin in powdered form to the pile material in approaching the said punching area, and heating the resin among the fibers of the felt to render it adhesive by needle-punching the pile material after the application of the resin.

3. The process defined in claim 2 further characterized in the heating of the resin and rendering it adhesive by the frictional heat developed in passing the needles into and out of the felt after the application of the resin.

4. The process of making needled felt which is characterized by the steps of first sifting a thermoplastic resin in powdered form into a layer of nap-forming fleece which overlies a base fabric, then needle-punching the fleece to the base fabric, and at the same time supplying heat from an outside source to the punching area to render the resin adherent.

5. The process defined in claim 4 in which the resin is rendered adhesive by the combined friction heat of the needles and that supplied by an external infra-red heater.

6. The process of making needled felt which is characterized by the step of mingling a fusible synthetic resin in powdered form with the fibers of a fibrous bat and then needle-punching the bat after the application of the resin thereto and rendering the powdered resin tacky during the needle-punching operation.

7. The process of making needled felt which is characterized by the step of mingling a fusible synthetic resin in powdered form with the fibers of a fibrous bat supported upon a base fabric containing thermoplastic fibers, and then needle-punching the supported bat and at the same time rendering adhesive both the resin particles and the thermoplastic fibers by the frictional heat of the needles.

References Cited in the file of this patent

UNITED STATES PATENTS

| Number | Name | Date |
|---|---|---|
| 2,232,647 | Zirkman | Feb. 18, 1941 |
| 2,372,433 | Koon | Mar. 27, 1945 |
| 2,373,033 | Kopplin | Apr. 3, 1945 |
| 2,437,689 | Francis | Mar. 16, 1948 |
| 2,444,115 | Reed | June 29, 1948 |
| 2,528,129 | Francis | Oct. 31, 1950 |
| 2,671,496 | Chavannes et al. | Mar. 9, 1954 |
| 2,794,759 | Dildilian | June 4, 1957 |

FOREIGN PATENTS

| Number | Country | Date |
|---|---|---|
| 562,308 | Great Britain | June 27, 1944 |